United States Patent Office 2,985,107
Patented May 23, 1961

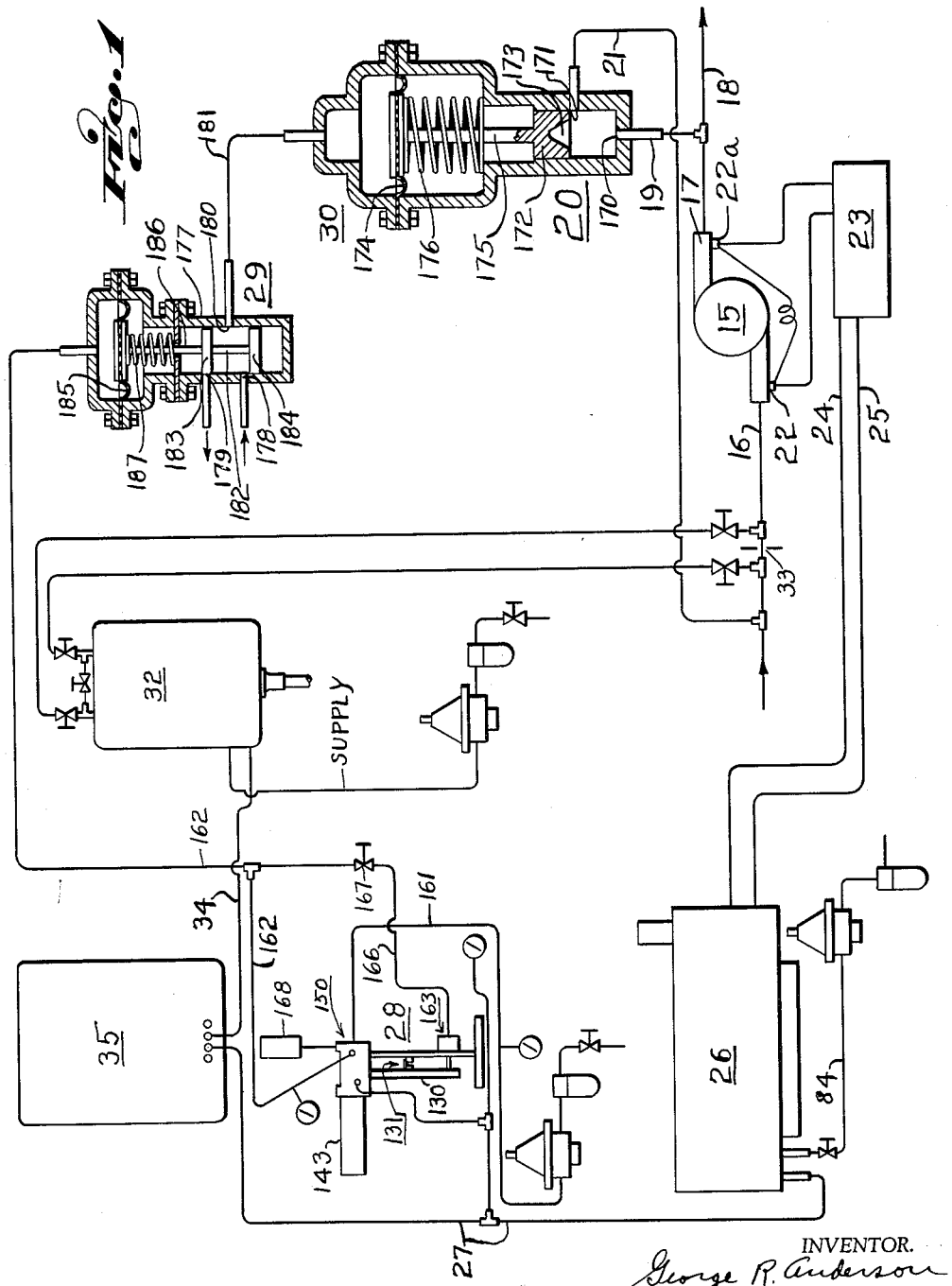

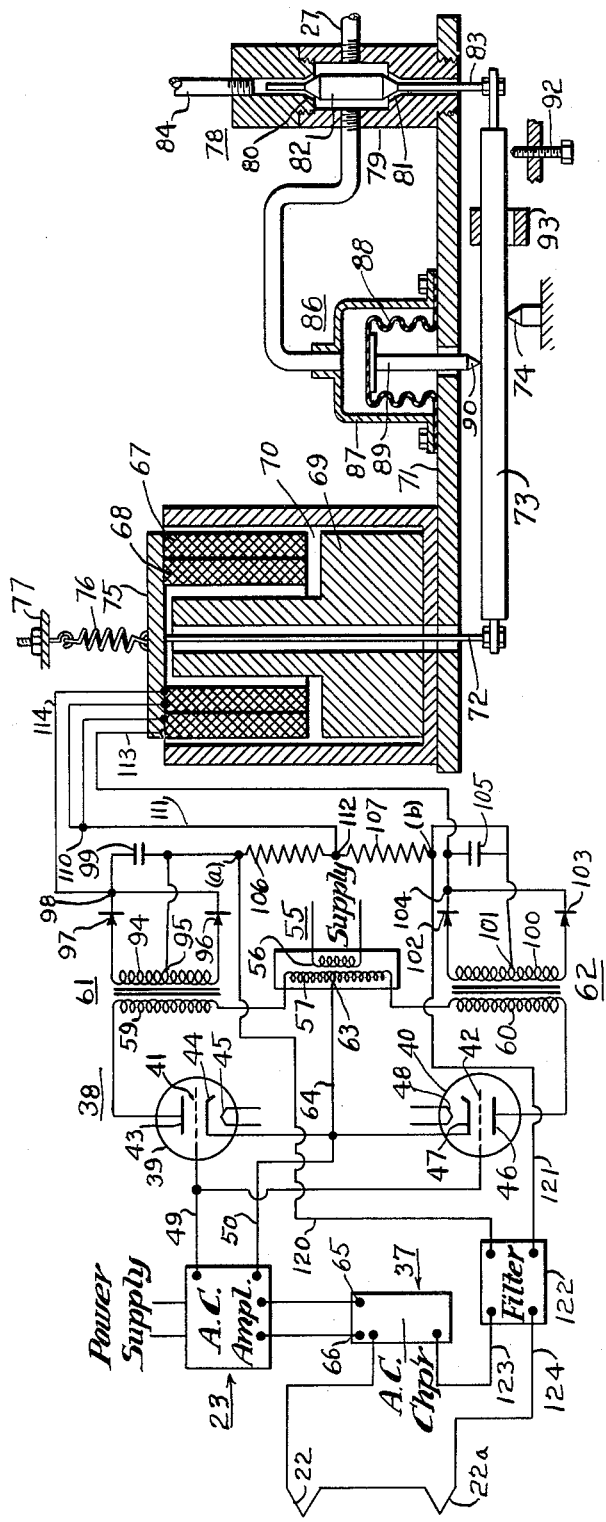

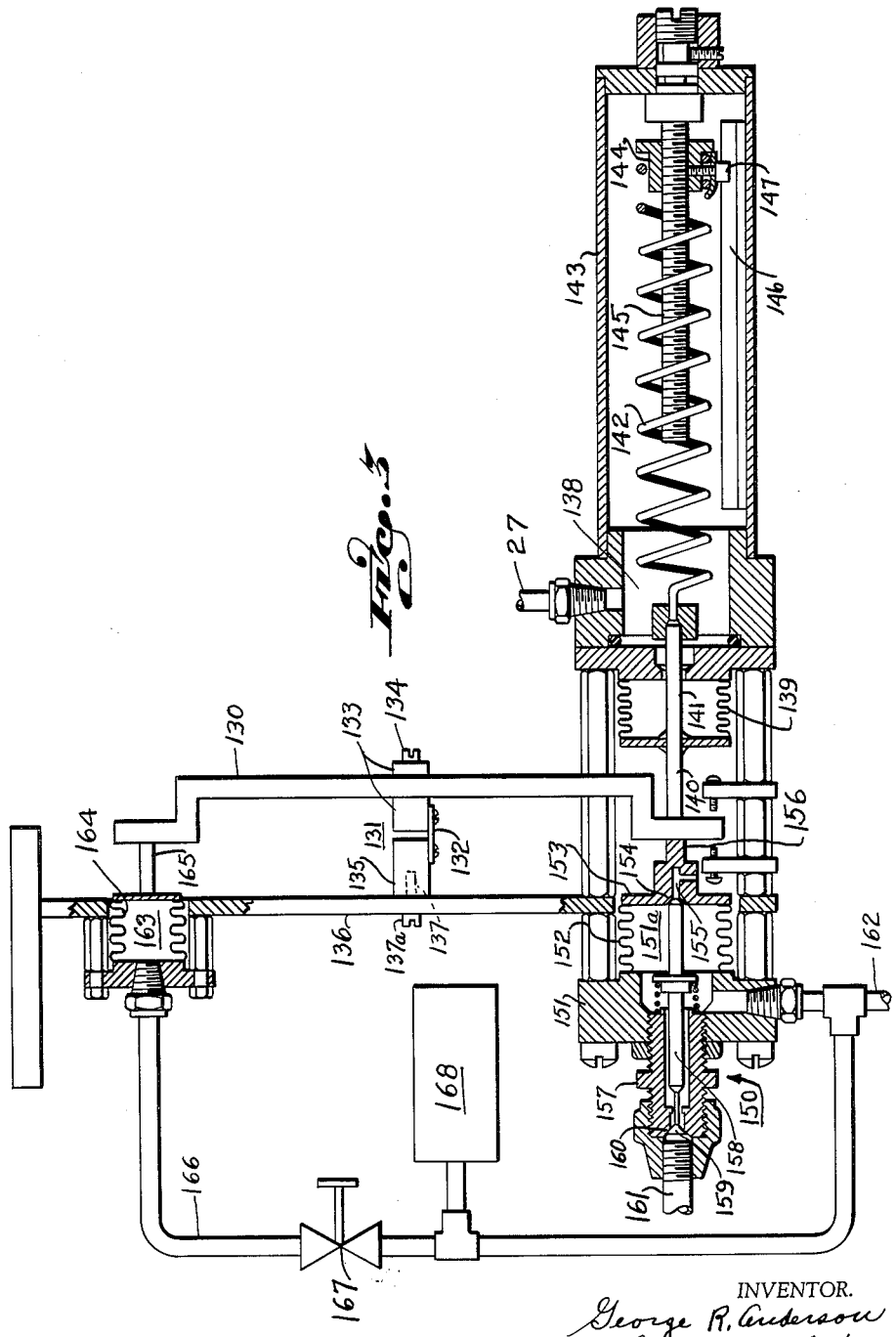

2,985,107

SYSTEMS FOR AUTOMATICALLY CONTROLLING FLOW OF FLUID THROUGH A CENTRIFUGAL PUMP IN RESPONSE TO TEMPERATURE DIFFERENTIALS AT THE INTAKE AND DISCHARGE THEREOF

George R. Anderson, Mt. Lebanon Township, Allegheny County, Pa., assignor to Hagan Chemicals & Controls Inc., Pittsburgh, Pa., a corporation of Pennsylvania Filed May 19, 1958, Ser. No. 736,274

4 Claims. (Cl. 103—97)

This invention relates to a control system for preventing damage to liquid handling pumps of the centrifugal type when operating against a closed discharge valve or when the flow through the pump is so low that undue heating is likely to occur in the pump.

When a centrifugal pump is in operation, a portion of the energy supplied to the pump by the driving unit is absorbed in friction, shocks, eddy currents and churning within the pump. That energy is transformed into heat which increases the temperature of the liquid discharging from the pump. When there is a considerable flow of liquid through the pump, the temperature rise is comparatively small and does not involve serious consequences, but, when the pump is operating against a closed discharge valve or when the flow of liquid through the pump is too low, the temperature rise through the pump can be quite considerable and may be of such magnitude that in a few minutes the temperature of the liquid may rise to the boiling point causing a substantial portion of the liquid to be evaporated. Such vaporization may prevent the flow of water into the suction or intake of the pump, thereby preventing the pump from discharging liquid, with the consequence that seizure or other damage may occur between the rotating and the stationary parts of the pump because of lack of adequate supply of liquid for cooling and lubricating purposes.

Where there are a large number of centrifugal pump installations operating in parallel, a certain minimum flow through each pump is necessary in order to avoid the above mentioned dangerous conditions arising. Heretofore, provision has been made to ensure that whenever there was a danger of the flow through the pump falling below the minimum required to ensure safe operation, an emergency outlet from the discharge of the pump was opened, either by hand or automatically to allow the pump to discharge a predetermined minimum quantity of liquid back to the source of the liquid supply or to the intake of the pump thereby maintaining a sufficient flow through the pump to prevent a dangerous rise in temperature.

An object of this invention is to provide an improved system for so controlling the recirculation of fluid such as steam boiler water from the discharge of the pump back to the intake, that the temperature rise across the pump, or selected stages thereof, will be maintained within safe operating limits.

A further object of the invention is to provide a system having thermocouples attached to the intake and discharge connections of the pump that generate voltages proportional to the difference between the temperatures at the intake and at the discharge of the pump and means for amplifying the thermocouple differential voltages and translating those voltages into usable control impulses that operate the recirculation valve to provide controlled recirculation.

A still further object of the invention is to provide a system in which the recirculation valve is modulated thereby establishing a controlled rate of recirculation through the centrifugal pump, thereby ensuring its safe operation at all times.

Other objects and advantages of the invention will be apparent to those of ordinary skill in the art to which the invention pertains from the following description and the accompanying drawings.

In the drawings:

Figure 1 is a more or less diagrammatic view of a system embodying the invention for providing modulated control of flow through a centrifugal boiler feed pump when operating against a closed or substantially closed feed line valve, the system including thermocouples at the inlet and outlet of the pump;

Fig. 2 is a schematic view of a circuit included in the system of Fig. 1; and

Fig. 3 is a view in section of a regulator in the system of Fig. 1.

In Figure 1 a general schematic layout is shown which includes a centrifugal pump 15 driven by a turbine, or other form of drive, not shown. The pump may be assumed to be one that delivers feed water to a boiler. The pump receives water at its intake from a feed water line 16 and the water is discharged at higher pressure through the discharge connection 17 into the boiler high pressure feed line 18.

The feed line 18 is connected by a branch pipe 19 to a by-pass valve 20 that returns the water to the supply source or to the pump intake when the valve is open, through a return line 21. By modulating valve 20, a sufficient flow of water through the pump may be maintained when the demand for water is low or the pump is discharging against a closed or substantially closed feed line valve.

When the flow through the pump 15 is reduced as when a valve in the feed line (not shown) is either closed or in a restricted position, the water in the pump 15 because of churning, friction, eddy currents, etc., may be so heated that the temperature at the outlet or discharge connection 17 may be materially higher than the temperature at the intake of the pump. If the difference in temperature between the intake and the outlet of the pump gets too high, the water may actually flash into steam and damage the pump.

In order to so control the valve 20 as to maintain adequate flow through the pump under the above conditions by returning regulated amounts of water to the supply source or to the intake of the pump when the temperature differential between its intake and discharge reaches a certain value, a control system as shown in Fig. 1, is provided. The control system includes a thermocouple 22 located in a suitable thermocouple well in the wall of the pump intake and a thermocouple 22a located in a suitable well in the wall of the discharge 17. These thermocouples may be of iron, constantan and connected in series, as shown, to supply input voltage to an amplifier 23 (see Fig. 2).

The output of the amplifier 23 is delivered through conductors 24 and 25 to an electromagnetic converter 26. The converter 26 converts the voltage input from the amplifier 23 into a pneumatic output that is delivered to a signal line 27. The output of the signal line 27 is delivered to a regulator 28 and the output of that regulator is delivered to a valve 29 that controls the transmission of pneumatic control impulse signals to a diaphragm operator 30 for the valve 20.

The regulator 28 is designed to transmit a pneumatic signal that varies between zero gauge pressure and a predetermined maximum pressure as for example 30 p.s.i.g. The valve 29 is operated by the signal pressure of the regulator 28 and it is designed to transmit to the diaphragm operator 30 a signal that varies in magnitude between a maximum value to zero gauge pressure. The maximum value may be 30 p.s.i.g.

When the valve 29 is receiving a zero signal pressure, that valve is closed so that the signal to the diaphragm operator 30 of valve 20 is also zero or atmospheric pressure. When the pressure on the diaphragm operator 30 is zero gauge, valve 20 is open; it is closed when it receives the maximum signal pressure which, in the case assumed, is 30 p.s.i.g. When the input signal to the regulator 28 is zero p.s.i.g., the output signal is zero. When the input signal reaches a predetermined value, regulator 28 commences to transmit signal pressures, the range of which in the case assumed would be zero to 30 p.s.i.g.

The circuit of the amplifier 23, including the thermocouples 22 and 22a, the electropneumatic converter 26, the diaphragm operated valves 20 and 29 are shown in Fig. 2 and the regulator 28 is shown in Fig. 3.

The general organization view of Fig. 1, also shows schematically a meter 32 that measures the pressure differential across an orifice 33 in the intake feed line 16 of the feed pump 15 and develops an output signal that is proportional to the flow in pounds per hour. That signal is delivered through a signal line 34 to a meter 35. Since the meter 35 receives signals from the water flow meter 32 and the electromagnetic converter 26, the meter 35 measures the pounds of water per hour corrected for temperature.

The circuit shown in Fig. 2 utilizes the voltages generated by the thermocouples 22 and 22a as the input or signal voltage and the value of that input voltage is proportional to the difference between the temperature of the water at the intake and the outlet, respectively, of the feed pump 15. The thermocouple voltage is passed through a chopper 37. The output of amplifier 23 is supplied to the control grids of a demodulator 38. The demodulator comprises tubes 39 and 40 having control grids 41 and 42, respectively. The tube 39 is provided with a plate 43, a heated cathode 44 and a heater 45. Tube 40 is provided with a plate 46, a heated cathode 47 and a heater 48. Grids 41 and 42 are connected to output conductor 49 of amplifier 23, and the heated cathodes 44 and 47 of tubes 39 and 40 are connected to the amplifier output conductor 50.

Operating voltage for the plates 43 and 46 of tubes 39 and 40 is supplied by a supply transformer 55 having a primary winding 56 and a secondary winding 57. The opposite terminals of the winding 57 are connected to plates 43 and 46, respectively, through primary windings 59 and 60, respectively, of transformers 61 and 62. The transformer winding 57 has a midtap 63 which is connected by a conductor 64 to the heated cathodes 44 and 47.

The amplitude of the grid voltage applied to the grids 40 and 41 is proportional to the voltage between the terminals 65 and 66 of the chopper 37 and its phase is determined by the polarity of the voltage between these terminals as derived from the thermocouples 22 and 22a.

The outputs of transformers 61 and 62 are rectified and supplied to coil windings 67 and 68 of the electropneumatic converter 26. The converter 26 includes a magnetic core 69, having an airgap 70 in which the coil windings 67 and 68 are disposed. The core 69 is supported by a base 71 and the coil windings are connected by a link 72 to one end of a beam 73 mounted on a knife edge fulcrum 74.

The coil windings 67, 68 may be secured to a member 75 that is yieldingly suspended by a spring 76 from a support 77. The device 26 also includes a pneumatic escapement valve 78 having a body 79, inlet and exhaust port seats 80 and 81, respectively, between which a movable valve member 82 operates. As shown, the opposite ends of the member 82 are frusto conic, conforming substantially to the taper of the seats 80 and 81.

The member 82 is connected by a link 83 to the beam 73 as shown. Thus, as the beam rocks on the fulcrum 74, the valve 82 is moved in one direction or the other to either close or restrict the inlet seat 80 and open the exhaust seat, or to close or restrict the exhaust seat 81 and open the inlet port. When the exhaust seat 81 is closed, the pressure transmitted by the valve is a maximum and when wide open with the inlet port seat 80 completely closed, the pressure transmitted by the valve is zero gauge. The inlet 80 is supplied with pressure at a constant value of say 30 p.s.i.g. through a supply pipe 84. The signal transmitted by the valve is delivered to the signal pipe 27.

In order that the electric input to the coils 67 and 68 may be balanced against the transmitted pressure, a balancing device 86 is provided. Device 86 comprises a pressure tight housing 87 having therein a bellows or other pressure deflectable member 88 provided with a push rod 89 having a knife edge 90 at its lower end that engages the beam on the same side of the fulcrum as the link 72 is connected.

Since the core 69 is of a permanent magnetic material, the force developed by the coils 67 and 68 will be substantially linearly proportional to the magnitude of the current. Thus for each value of input to the coils 67 and 68 there will be a definite output pressure from the valve 78 and the moment of that pressure, being fed to the device 86, balances the moment of the force of the coils on beam 73.

The beam 73 may be provided with a stop 92 to limit clockwise rotation of the beam and it may be provided with a weight 93 by which the beam may be balanced against the components of the device that act on it at zero input.

The voltage supplied to coils 67 and 68 is derived from the transformers 61 and 62. Transformer 61 includes a secondary winding 94 having a midtap 95. The terminals of the winding 94 are connected through rectifiers 96 and 97, which can be of the dry area type, such as selenium, to a junction point 98. The midtap 95 is connected to the junction point 98 through a condenser 99. The arrangement thus described provides full wave rectification of the output voltages of windings 94 and 95.

The transformer 62 includes a secondary winding 100 having a midtap 101. The terminals of winding 100 are connected through rectifiers 102 and 103 to a junction point 104. The midtap of winding 100 is connected to the junction point 104 through a condenser 105. Series connected voltage drop resistors 106 and 107 are connected to midtap 95 of winding 94 and to midtap 101 of transformer winding 100 of transformer 62. One terminal of each of coils 67 and 68 are connected by a common connection 110 and a conductor 111 to the common connection 112 between resistors 106 and 107. Terminal 113 of coil winding 67 is connected to junction point 100 and terminal 114 of coil winding 68 is connected to junction point 98.

The windings 67 and 68 are so connected that when current flows in one of them, or more current flows in one than in the other, the two windings move upwardly; and when current flows in the other or more current flows in it than in the other, the windings move downwardly. The force urging the windings upwardly or downwardly is a function of the net effect of the current flowing in them.

With the circuit arrangement as above described, it will be apparent that if the voltage between junction points 112 and 98, and the voltage between junction points 112 and 104 are equal, coil windings 67 and 68 will be equally energized in opposed relation; therefore, they will assume a neutral position in the air gap of the permanent magnet. If the voltage between points 112 and 98 is higher than the voltage between points 104 and 112, winding 68 will be energized more than winding 67 and, assuming that the current in winding 68 causes the coils to move upwardly in the air gap, the windings 67 and 68 will move upwardly.

When the voltage between points 112 and 104 is higher than the voltage between points 112 and 98, winding 67 is energized more than winding 68 and, assuming that the direction of the current in winding 67 is such as to cause the windings to move downwardly in the air gap, the windings will move downwardly. Thus the pilot valve 78 will be actuated from a mid position towards the inlet port seat or towards the exhaust port seat, thus decreasing or increasing the pressure signal in the signal line 27. The valve 82 may be in its fully closed position in which case the signal to line 27 is zero or it may be in the position where the exhaust seat 81 is fully closed in which event the pressure to signal line 27 will be a maximum which, in the case assumed supra, is 30 p.s.i.g.

In order to stabilize the gain of the amplifier 23 so that the ratio of output to the input to the amplifier may remain substantially constant, a voltage proportional to the voltage difference between terminals (a) and (b) of the resistors 106 and 107 is fed back to the chopper 37 by conductors 120 and 121 through a filter 122 and conductors 123 and 124. The conductors 123 and 124 are connected to terminal 66 of the chopper 37 and to the thermocouple 22, respectively. Thus the voltage fed back to the thermocouples 22 and 22a will either add to or substract from thermocouple voltages, according to the difference between the voltages at the points (a) and (b) of resistors 106 and 107 and the polarity and phase relation of those voltages. Thus the gain ratio between the voltage input to the amplifier 23 and the voltage applied to the coil windings 67 and 68 is maintained at a predetermined value, and that ratio may be of the order of 10 to 1.

If the temperature differential at the locations of thermocouples 22 and 22a is very low or substantially zero or within a predetermined range from zero, the valve 20 will be held in its closed position which means that the signal pressure to the diaphragm operator 30 will be at maximum value. Consequently, the valve 29 will be receiving a signal that causes the transmission of a maximum signal to the diaphragm operator 30. Therefore, it follows that when the temperature differential between couples 22 and 22a at the intake and discharge of the pump 15 is zero or below a predetermined value, the valve 82 will be seated on the exhaust port seat 81. As the temperature differential rises and finally reaches the point where it is necessary to open valve 20, the valve 82 of device 26 will be actuated by the coil windings 67 and 68 towards the inlet port seat 80 and away from the exhaust port seat 81, thereby reducing the pressure transmitted through the signal line 27 to the regulator 28. As the signal in line 27 decreases, the regulator 28 transmits a decreasing signal to the operator of valve 29 which causes that valve to reduce the signal sent to the operator 30 of valve 20 causing valve 20 to open the amount called for by the signal. It opens wider and wider as the signal of regulator 28 reduces the signal delivered to the operator of valve 29. The operation of the regulator 28 will be given in connection with a description of its construction in the following.

Regulator 28 is shown in Fig. 3. It comprises a beam 130 mounted on a frictionless fulcrum 131 in the form of a leaf spring 132. The leaf spring 132 is secured to the block 133 that is slidably mounted on the beam and may be secured to it in any desired location by a set screw 134. The lower end or the opposite end of the leaf spring 132 is secured to a block 135 that is supported on a base or frame 136 of the device. The base may be slotted to accommodate a clamping screw 137 and nut 137a so that the fulcrum may be adjusted along the length of the beam to provide different lengths of lever arms from the fulcrum to the opposite ends of the beam.

The device 28 includes an input chamber 138 that communicates with the interior of a pressure deflectable member such as a bellows 139. One end of that bellows is provided with a rod 140 that acts on the right-hand end of the beam and with another rod 141 that extends outwardly through the chamber 138 and is connected to one end of a spring 142. The spring is contained within a tubular housing 143 that is secured in pressure tight relation to the chamber. The other end of the spring 142 is connected to a nut 144 mounted on a screw 145 supported by the outer and closed end of housing 143. The nut is prevented from turning within the spring barrel 143 by means of flanges 146 disposed on opposite sides of the head of a screw 147 that clamps the spring to the nut.

The spring barrel 143, as shown, is pressure tight and the screw 145 extends inwardly through its closed end where it can be turned by means of a wrench or screwdriver to adjust the tension of the spring. The spring pulls on the bellows in such a direction and with such a force that an input pressure equal to and just slightly exceeding it is required to rotate the beam 130 clockwise. The input signal to the diaphragm chamber and the tubular housing 143 is derived from the signal pipe 27.

Device 28 includes a pressure signal sending unit 150 that comprises a bonnet 151 to which one end of a bellows 152 is secured, to form a chamber 151a. The free end of the bellows is closed by a plate 153 having therein a valve seat 154 that leads to the atmosphere through a passage 155 in a lug 156 that bears against the beam directly opposite the point where the bellows of the input signal unit bears on the beam.

The unit 150 also includes a valve body 157 that is screwed into the chamber 151 and accommodates a valve stem 158. The inner end of the valve stem is disposed to seat on the exhaust seat and the outer end carries a valve element 159 that controls an inlet port 160 in the valve body. Air at constant pressure may be supplied to the valve body by a supply pipe 161. When the valve is in neutral position both the inlet and exhaust port seats are closed. If the beam 130 turns towards the valve stem, the inlet port is uncovered allowing pressure to enter the chamber 151 and pass on to the signal line 162.

The device 28 also includes a chamber 163 formed by a bellows 164, the free end of which is provided with a finger 165 that engages the beam on the left-hand side of the fulcrum. The output pressure of the device 150 is delivered to the chamber 163 through a pipe 166 in which is a needle valve 167. A volume or ballast chamber 168 is connected to the pipe 166 between the needle valve 167 and the chamber 150. The volume chamber and the needle valve give automatic reset and rate action characteristics to the regulator.

So long as the signal pressure in line 27 is below the force exerted by the spring 142, the pressure in the signal pipe 162 of the regulator 28 will be zero gauge. As the signal in line 27 increases thereby exerting a force tending to elongate the bellows in the input unit, the force of the spring 142 is diminished until the total force developed by the signal pressure on the bellows 139 overcomes the force of the spring and exerts a force tending to turn the beam 130 clockwise. When that occurs, the inlet port of the valve body 157 is uncovered, allowing pressure to enter the chamber 151. The force of that pressure opposes the force exerted by the bellows 139; but as the pressure passes the needle valve 167 to the chamber 163, the force developed by the bellows in that chamber acts on the beam 130 tending to turn it clockwise in the same direction as the bellows 139 does; therefore, the valve stem 158 will remain in open position and further increase the pressure in the signal line 162. As that pressure increases, the pressure to the diaphragm operator of valve 29 increases causing that valve to move towards closed position and reduce the pressure on the diaphragm operator 30 of valve 20. Therefore the valve 20 will be actuated towards closed position until the regulator 28 resets to its regulating point.

Thus the regulator 28 regulates until the condition is satisfied as reflected by the value of the signal in the signal pipe 27 of the electropneumatic converter 26.

When valve 20 is moving towards closed position that indicates that the temperature at the outlet 17 of the centrifugal pump 15 is being reduced to a safe value. However, as the signal in line 27 from the device 26 commences to decrease that indicates that the temperature at the thermocouple 22 is increasing towards its danger point. Thus as the temperature differential rises, the signal to the regulator 28 from the signal pipe 27 decreases. For that reason, the signal output of regulator 28 to the signal line 162 decreases until the valve 29 has been moved to a position where pressure is exhausted from the signal line to the diaphragm operator 30 of valve 20. When that pressure has been decreased to zero, the valve 20 will be in wide open position thereby allowing the maximum amount of recirculation through the centrifugal pump 15.

The valve 20 as shown comprises a body having an inlet port 170 and an outlet port 171 controlled by a valve plug 172 having in it V-shaped ports 173 or ports of such shape as will provide the necessary flow characteristics in the valve. As the valve plug moves downwardly it restricts the outlet port to the line 21 and ultimately closes it. The closing of the valve is accomplished by the diaphragm 174 of the operator 30. That diaphragm, when loaded with pressure, moves the valve plug 172 downwardly by the push rod 175. The diaphragm works against a compression spring 176 which biases the valve towards open position.

While the valve 20 and its operator 30 have been schematically illustrated, it will be appreciated by those skilled in this art that any valve suitable for the purpose may be employed.

The valve 29 comprises a valve body 177 having a supply port 178 to which is connected a supply of air pressure at constant pressure, say for example 30 p.s.i.g., exhaust port 179 and an outlet port 180 connected by a pipe 181 to the operator 30. In the valve body is a spool-type valve 182 having lands 183 and 184 that control the exhaust and supply ports. When the exhaust port 179 is closed by the spool being moved downwardly, the supply port 178 is opened thereby allowing air pressure to flow through the outlet port 180 to the operator 30. As the valve moves upwardly, it restricts the supply port and begins to open the exhaust port, thereby reducing the pressure delivered to the operator 30. When the valve spool 182 is in its uppermost position, the supply port is closed and the exhaust port is fully open, thereby reducing the pressure to the operator 30 to atmospheric.

The valve spool 182 is operated by a diaphragm 185 connected to the spool by a rod 186 that engages the underside of the diaphragm. The diaphragm works against a compression spring 187 so that the valve spool will take a definite position for each value of pressure and will always be urged towards a position in which the supply port 178 is closed. Since valves of this type are well known, further detailed description is believed unnecessary.

From the foregoing description, it will be observed that a system is provided for establishing a modulated flow of fluid, such as feed water, through a centrifugal feed pump when demand is low, by measuring the temperature differential between the inlet and the discharge of the pump by means of thermocouples. The system includes means for amplifying the thermocouple voltages and developing an output current that is proportional to the temperature differential. The amplifier output is received by an electropneumatic converter by which it is converted to a pneumatic output signal that constitutes the input for a regulator. The regulator operating in response to that input signal controls the operation of the flow modulating valve to provide the required modulated recirculation of fluid through the pump.

Having thus described the invention, it will be apparent to those of ordinary skill in the art to which the invention pertains, that various modifications and changes may be made in the illustrated embodiment without departing from either the spirit or the scope of the invention.

Therefore, what is claimed as new and desired to be secured by Letters Patent is:

1. The combination with a centrifugal boiler feed pump provided with an intake for feed water, a discharge conduit adapted to supply a boiler with feed water and a by-pass including a valve whereby the pump outlet may be connected to said intake and the flow therethrough regulated thereby; of a system for so modulating said by-pass valve as to regulate the differential between the temperatures at said inlet and said discharge by controlling the rate of flow through the pump and by-pass thereby to prevent excessive temperature rises in the water within the pump at times when the feed water demand is low, said system comprising interconnected thermocouples disposed to be sensitive to the temperatures at the inlet and discharge of the pump, respectively, means connected to said thermocouples for converting the resulting thermocouple voltages into a resultant A.C. voltage, means connected to and receiving the resultant A.C. voltage from said means connected to the thermocouples for amplifying said resulting voltage, means connected to said means for amplifying for converting said amplified voltage into a signal whose magnitude is proportional to said amplified resultant voltage, a regulator connected to said means for converting having means responsive to said signal and means actuated thereby for generating a control signal proportional to said amplified voltage, and a valve operator means responsive to said regulator control signal for modulating said valve between open and closed positions thereby to maintain a rate of flow of water through the pump that is substantially proportional to said differential temperature at low demands for feed water.

2. A combination as in claim 1 in which means are provided for modulating the output of said amplifier and developing voltages whose phase relation and polarity vary with the input signal to the amplifier, and that the converting means is provided with a permanent electromagnet having coil windings connected to be energized by said voltages, and a pneumatic valve means actuated by said coil windings for developing a pneumatic signal varying in magnitude with said voltages.

3. A combination as in claim 2 in which means are provided for modifying the thermocouple voltages in accordance with the difference between said modulated voltages.

4. A combination as in claim 1 in which the regulator is provided with an input means biased to be operative at a predetermined value of input signal, output signal means operated by said input signal responsive means when the input signal is in excess of said predetermined value, and means responsive to the regulator output signal for providing automatic reset and rate action in the regulator.

References Cited in the file of this patent

UNITED STATES PATENTS

| | | |
|---|---|---|
| 2,207,809 | Lauffer et al. | July 16, 1940 |
| 2,442,049 | Lee | May 25, 1948 |
| 2,606,420 | Moore | Aug. 12, 1952 |
| 2,610,466 | Ballantyne et al. | Sept. 16, 1952 |
| 2,646,931 | Suter | July 28, 1953 |
| 2,672,820 | Hillier | Mar. 23, 1954 |
| 2,707,440 | Long et al. | May 3, 1955 |
| 2,888,809 | Rachfal | June 2, 1959 |